Aug. 11, 1964    J. E. NEIHEISEL    3,144,120
ARTICLE INVERTER

Filed Sept. 7, 1961    3 Sheets-Sheet 1

INVENTOR.
JOHN E. NEIHEISEL
BY James E. Coaney
ATTORNEY

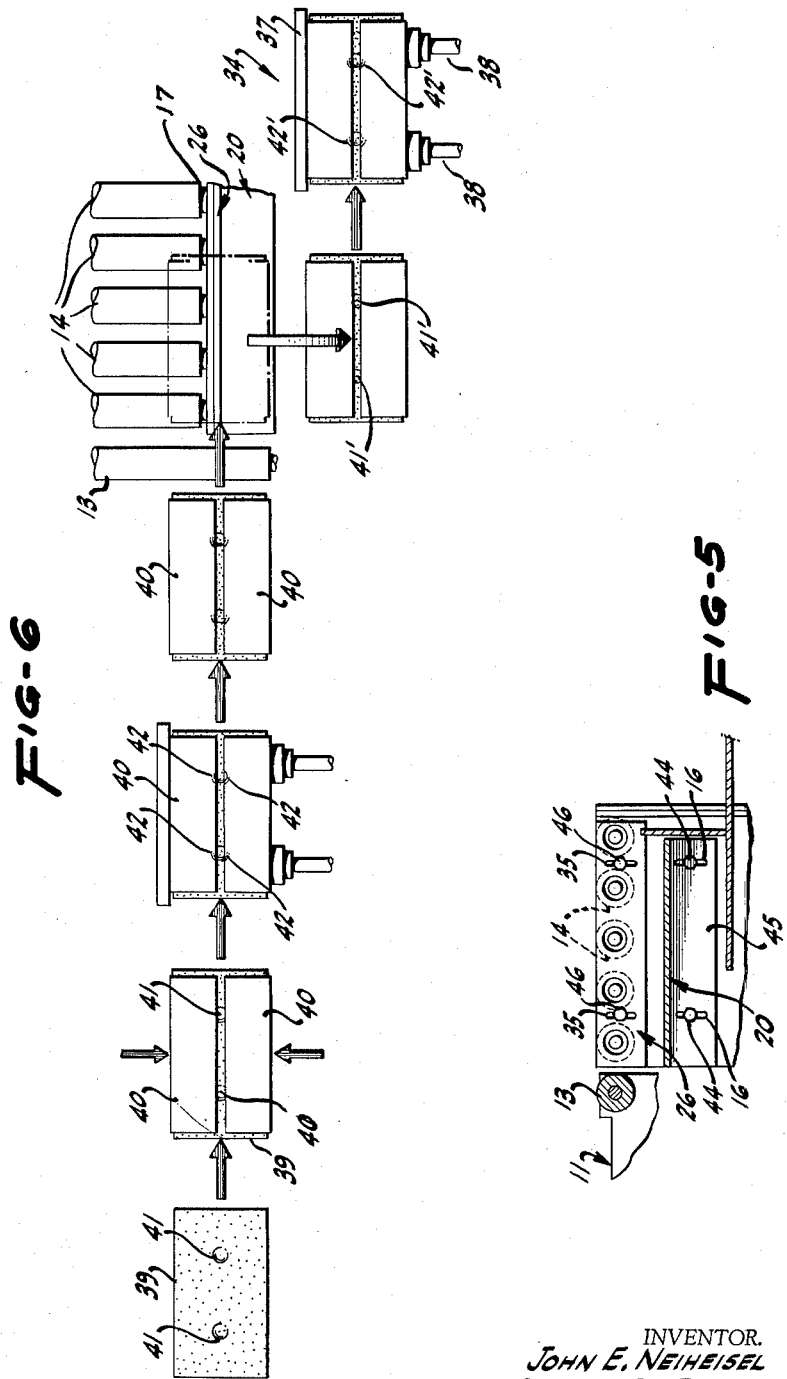

United States Patent Office 3,144,120
Patented Aug. 11, 1964

3,144,120
ARTICLE INVERTER
John E. Neiheisel, Leetonia, Ohio, assignor to Kaiser Aluminum & Chemical Corporation, Oakland, Calif., a corporation of Delaware
Filed Sept. 7, 1961, Ser. No. 136,602
6 Claims. (Cl. 198—33)

This invention relates to a device for turning over an article while the article is advancing on a conveyor line; and more particularly it relates to a device for turning a refractory brick on its long horizontal axis through an arc or an angle of 180°.

In applying metal cases to refractory bricks or shaped articles it is frequently desirable to perform work on opposite faces of the brick successively. Thus, if two channel, or U-shaped, cases are applied in opposing relationship to the longitudinal faces of a basic brick, it may be desired to dimple or to weld the cases together at two opposite faces and it is frequently desirable to bring the dimpling device or the welding head down on the brick from above. In such instance, the brick must be turned over, or through 180° on its horizontal axis, to effect the second operation. In other operations, where work must be performed on two opposite faces of an article and in successive steps, such a turning operation is also necessary. Although the invention is described with particular reference to work on bricks, it will be understood that other articles can be treated or handled thereby also.

The present invention provides a device and method for turning over such brick or other article of generally rectangular cross-section, e.g., a metal-encased basic brick, through an arc or an angle of 180° on its horizontal axis, in a simple and economical manner. The device includes a pair of conveyors, the second member of the pair being disposed below the first member and laterally displaced therefrom to receive the turned brick, and a turning means in series between the two conveyors. The features, objects and advantages of the invention will be more completely explained by the following description, and by the annexed drawings wherein:

FIGURE 5 is an elevation view on line 5—5 of FIGURE 1, showing a pivot plate and turn bar arrangement;

FIGURE 6 is a schematic showing of the installation and utilization of the turning device in a brick encasing line.

In the present invention, the article, such as a block or brick, which is to be turned, is forwarded on a first conveyor which is substantially horizontally disposed and thence goes onto a series of idler rollers, of which the first roller is preferably at least co-extensive in length with the width of the first conveyor. The remaining rollers are shorter and terminate in a place which bisects the article to be turned at a point displaced inwardly from its center of gravity, whereby the brick is directed downwardly away from the end of the rollers. Disposed beneath and normal or perpendicular to the ends of the idler rollers is a horizontally extending plate or flange, arranged in such manner that the leading edge of the downwardly turning brick strikes or is engaged by such flange so that the brick continues to turn, completing a half revolution, or turns through an angle of 180°, and terminates its fall or turn on a second conveyor means, with its opposite surface oriented upwardly. The brick is then conveyed further as desired, for example, to a second punching or dimpling station, suitably positioned under the punching device, and then dimpled or punched. The second conveyor can run in the same direction as the first conveyor or in the opposite direction, if desired, and is disposed beneath the turning flange and laterally displaced therefrom to receive the turned article.

The device will be described with respect to its operation in turning or re-orienting metal-encased bricks but it is to be understood that other articles can also be turned or pivoted about a horizontal axis in the same manner by the apparatus of the invention.

In the metal encasement of bricks it is a frequent practice to place a channel or U-shaped case, having a web and two arms, on a chemically bonded or on a burned nonacid or basic brick; and in many instances, two such cases are applied in opposing relationship. In one such operation, dimples or shallow depressions are pre-molded in opposite side faces of the bricks and the case is so applied that one arm of a channel case terminates, or its edges lie, above such dimples so that the edges are later pressed down and deformed into the dimples. This securely affixes the brick to the plate and prevents the brick from falling out of the case during handling and installation, thus accelerating installation and, more importantly, preventing injuries to the workmen.

In handling the bricks by the conventional, hitherto-known methods, the brick edges have frequently been damaged or cracked in turning them over in order to depress the plate into the dimples on both side faces. It has been found that rolling the brick according to the present invention greatly reduces and substantially eliminates such injury to the brick, thereby reducing rejects and enabling more efficient and economical over-all production. It is also an advantage of the device of this invention that it requires very little or no supervision and maintenance.

Figure 2:
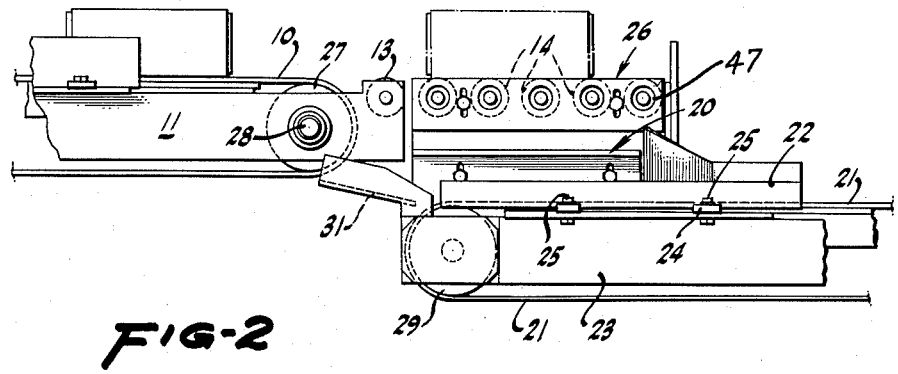
FIGURE 2 is a side elevation view of the apparatus of FIGURE 1.
Figure 1:
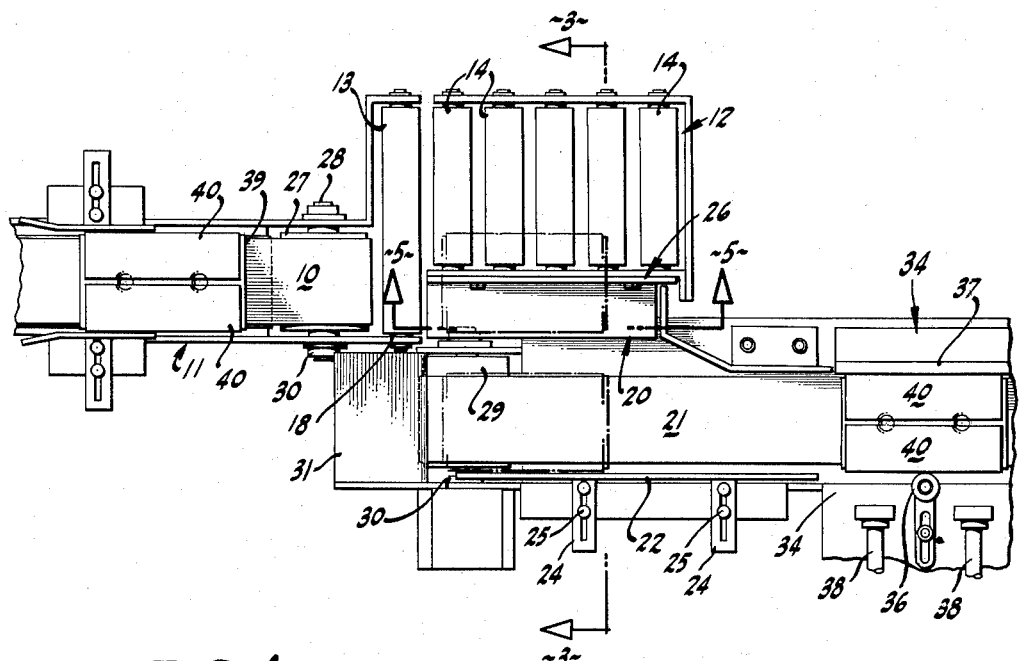
FIGURE 1 is a plan view of the apparatus having the turning means and the conveyors.
Figure 3:
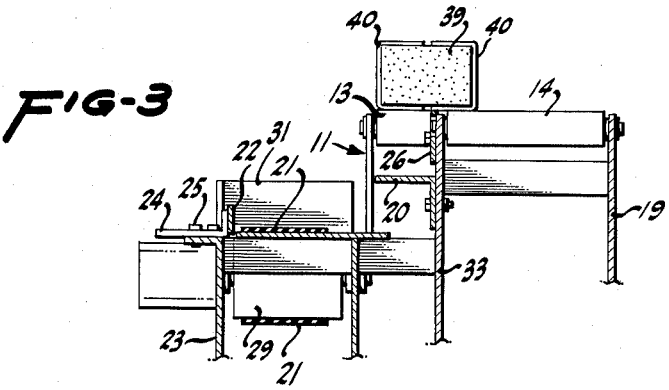
FIGURE 3 is an elevation view taken on line 3—3 of FIGURE 1.

In the drawings 10 is a first conveyor, in this instance an endless belt conveyor of conventional type, suitably supported by a frame 11. Disposed adjacent the end of belt 10 is idler roller assembly 12, wherein the axes of the rollers 13 and 14 are perpendicular or transverse to the long axis or direction of feed of the belt and the rollers 13 and 14 function to convey an article forwardly in the same direction of travel. Roller 13 is immediately adjacent end 15 of belt 10 and suitably extends across the entire width of the belt, as shown in FIG. 1. Roller 13 is supported by conventional bearings disposed in frame 11. Rollers 14 are so disposed that their working ends 17 are laterally inwardly displaced from the end 18 of roller 13 and from the center line of belt 10, whereby they are displaced laterally from the vertical plane of the center of gravity of the article coming from the conveyor, and the rollers partially support the articles, in an unstable state. The rollers 14 are suitably supported by frame 19 and rotate freely thereon. Pivot bar 26 is removably attached to end plate 33 of frame 19 and is vertically adjustable with respect thereto. This bar is provided with apertures 47 to accommodate the ends of the bearings supporting rollers 14, and with slots 35 and bolts 46 whereby the bar 26 is vertically adjustable with respect to plate 33. The top of this bar is preferably disposed in the same horizontal plane as the tops of rollers 14, which suitably all lie in a common horizontal plane. Bar 26 is also disposed slightly off-center or laterally displaced from the center of gravity of the brick to be turned and acts as a pivot point, preventing also wear or damage to plate 33 and ends 17 of rollers 14. Disposed below and adjacent ends 17 of rollers 14 and pivot bar 26 is generally horizontal bar or flange 20. Flange 20 is disposed perpendicularly or normal to the axes of and below rollers 14, suitably a distance of from one-half to three-fourths the width of an article to be turned, and intermediate between the first and second conveyors. However, these dimensions can be varied. The flange extends outwardly to engage the leading edge of the falling article, and enables it to complete the 180° turn. The flange is vertically adjustable and it has been found that, by varying such vertical adjustment, bricks of any of the commercially available sizes, e.g., of from 3 inch to 9 inch widths, are successfully turned through 180°. The vertical adjustment is effected by slot 16 and bolts 44 in the vertical arm 45 of flange 20, attaching or affixing it in a vertically adjustable manner to plate 33 of frame 19.

A second conveyor, in this example an endless belt 21, is disposed below flange 20 and laterally displaced therefrom. This belt feeds in the same direction as the first conveyor in this example. Preferably, adjacent this conveyor is a horizontally adjustable positioning bar 22 which positions the turned article on the belt for forwarding to the next treatment station. In one suitable means for adjusting bar 22, it is held on a base 23 by means of slotted mounting brackets 24 and bolts 25. By loosening bolts 25, the bar 22 can be horizontally adjusted, depending upon the width of the brick or article to be conveyed.

The first conveyor belt, as shown in the drawings, passes around pulley 27 which is suitably supported in frame 11 by bearings of conventional design indicated schematically at 28. Second conveyor belt 21 passes around pulley 9 which is likewise supported in conventional bearing assemblies as at 30. Suitably an inclined plate 31 is disposed ahead of belt 21, and below the end of belt 10, whereby a brick which falls ahead of belt 21 is forced onto such belt and feeds in the desired direction. Rollers 14 are supported in end plates 32 and 33 by bearings of conventional type, and are freely rotating, e.g., in contact with a brick moving off conveyor 10.

The second endless conveyor belt 21 carries an article to a desired location, such as a punching station, in the example of operation to be described, indicated generally at 34. When a brick case is being punched, as will be described below, the encased brick is held firmly in position by back-up bar 37 and hydraulic rams 38 or equivalent means.

In one example of a method of encasing bricks to ensure tight and secure affixation of the case to the brick, a basic or nonacid straight brick, 39, of generally rectangular cross-section and having two end faces and four side faces, is molded with one or more shallow discontinuous depressions or dimples 41 in two opposite side or longitudinal faces. Two channels or U-shaped cases 40, are placed on the brick in such manner that the web of each channel covers a major portion of a side face of the brick and the channel webs are on opposite side faces. Each arm of a web then covers approximately one-half of a side face, adjacent the web, and the opposing edges of the arms lie adjacent each other and above the dimple 41, in the brick, as shown in FIG. 6.

Figure 4:
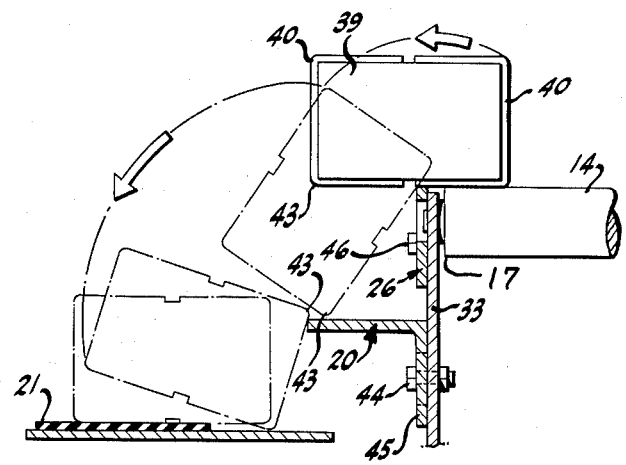
FIGURE 4 is an end elevation view of the turning means and elements, showing the path of a turning brick.

The case-bearing brick goes to a first punching station where the edges of cases 41 are punched or depressed or deformed at 42 into dimples 41 and into substantial conformity with the shape of the depression or dimple. The brick is held in position by suitable means until dimpled and is disposed centrally of the belt, i.e., the center line of the belt and that longitudinally of the brick substantially coincide. The cased brick is carried by conveyor 10 onto roller assembly 12. The brick may travel easily by momentum across roller 13 and onto rollers 14, all of which turn freely in ball-bearing supports, or it may be pushed along by a succeeding brick coming from the first punching station. The brick then falls off the working ends 17 of rollers 14 and pivot bar 26, the leading edge of the brick, e.g., as at 43 in FIG. 4, being engaged by or striking horizontal bar 20 whereby the brick is further turned through a total turn of 180° on its horizontal or in this instance longitudinal axis, and arrives on second conveyor 21 with the opposite set of dimples 41′ and arm edges facing upwardly. The thus-turned brick now goes to the second dimpling station being guided by means of adjustable roller 36 to a position between back-up bar 37 and hydraulic rams 38. Rams 38 are then activated to hold the brick firmly against bar 37 and in such position that the preformed dimples 41′ lie beneath the corresponding punches. The dimpling or punching device at 34 then deforms the edges of U-cases 40 into the opposing dimples as at 42′ and the cases are now securely affixed to the brick.

In the above-described method of encasing bricks, ferrous metal, or steel, cases are usually employed but cases made of other metal, such as aluminum or nickel can be used. In defining the working ends of the idler rollers and the pivot bar as displaced inwardly it is to be understood that this is intended to mean a displacement or offset, laterally toward an edge and away from the vertical plane of gravity of the article to be turned, so that the latter is no longer securely supported and falls downwardly away from the ends of the rollers. In another embodiment, instead of idler rollers 14 there is suitably employed a laterally displaced conveyor belt, but the roller assembly is preferred as being more economical and very efficient. It will be understood that other means than a solid horizontal flange, such as a toothed flange, can also be so disposed as to engage the leading edge of the falling article.

Having now described the invention, what is claimed is:

1. Device for turning an article comprising a first generally horizontal conveyor means supporting an article of generally rectangular cross section, a plurality of rollers in series with said conveyor means to receive said article, said rollers terminating in a vertical plane offset from the center of gravity of said article whereby said article falls from said rollers, a horizontally extending bar disposed beneath said rollers to engage the leading edge of said article as it falls, and a second generally horizontal conveyor disposed beneath said bar.

2. Device for turning an article of generally rectangular cross section through an angle of 180° comprising a belt conveyor for forwarding said article, a single roller means receiving said article from said belt, disposed in series with said roller a plurality of rollers terminating in a vertical plane offset from the center of gravity of said article whereby said article falls from said rollers, a flange extending horizontally and disposed below the ends of said series of rollers and adapted to engage the leading edge of said article as it falls from the rollers, and a second belt conveyor disposed below said flange to receive said article.

3. In an installation for metal-encasing bricks, a brick-turnover device comprising a first conveyor belt for a metal-encased brick, a first roller adjacent the end of said belt, a plurality of rollers in series with said first roller to receive said brick, the working ends of said rollers being displaced inwardly from the plane of the center of gravity of said brick, a vertically adjustable horizontal flange disposed beneath said roller ends for engaging the leading edge of said brick as it falls from said rollers, and a second conveyor belt disposed beneath said flange and laterally displaced therefrom to receive said turned-over brick.

4. Device for turning metal-cased bricks comprising a first generally horizontal belt conveyor adapted to convey a brick disposed centrally thereon, a first freely rotating roller disposed adjacent the end of said belt conveyor, a plurality of freely rotating rollers in series with said first roller and laterally displaced from the center line of said belt and adapted to partially support said brick, a vertical bar disposed normal to and adjacent the ends of said plurality of rollers and terminating in the same horizontal plane as said rollers, a generally horizontal flange disposed below said vertical bar, and a second horizontal belt conveyor disposed below and laterally displaced from said flange.

5. Device as in claim 4 wherein said bar is vertically adjustable.

6. Device as in claim 4 wherein said flange is vertically adjustable.

References Cited in the file of this patent

UNITED STATES PATENTS

| | | |
|---|---|---|
| 2,526,309 | Welch | Oct. 17, 1950 |
| 2,680,509 | Kandra | June 8, 1954 |
| 2,694,482 | Masengill | Nov. 16, 1954 |

FOREIGN PATENTS

| | | |
|---|---|---|
| 818,060 | Great Britain | Aug. 12, 1959 |